United States Patent
Kim

(10) Patent No.: US 9,096,046 B2
(45) Date of Patent: Aug. 4, 2015

(54) DIRECT HEATING TYPE CARD LAMINATION APPARATUS

(75) Inventor: Changbum Kim, Incheon (KR)

(73) Assignee: IDP CORPORATION LTD., Seoul (KR)

( * ) Notice: Subject to any disclaimer, the term of this patent is extended or adjusted under 35 U.S.C. 154(b) by 574 days.

(21) Appl. No.: 13/415,827

(22) Filed: Mar. 8, 2012

(65) Prior Publication Data

US 2013/0062017 A1 Mar. 14, 2013

(30) Foreign Application Priority Data

Mar. 11, 2011 (KR) .................. 10-2011-0021755

(51) Int. Cl.
 *B32B 37/06* (2006.01)
 *B32B 37/00* (2006.01)
 *B32B 41/00* (2006.01)

(52) U.S. Cl.
 CPC .............. *B32B 37/06* (2013.01); *B32B 37/0046* (2013.01); *B32B 41/00* (2013.01); *B32B 37/025* (2013.01); *B32B 2429/00* (2013.01); *Y10T 156/17* (2015.01)

(58) Field of Classification Search
 CPC .. B32B 37/0046; B32B 37/025; B32B 37/06; B32B 37/10; B32B 37/185; B32B 41/00; B32B 2041/06; B32B 2429/00
 USPC .................. 156/358, 359, 361, 362, 378, 538
 See application file for complete search history.

(56) References Cited

U.S. PATENT DOCUMENTS

| 4,060,441 | A | 11/1977 | Ohta et al. | |
|---|---|---|---|---|
| 6,095,220 | A * | 8/2000 | Kobayashi et al. | ........... 156/540 |
| 6,264,774 | B1 | 7/2001 | Lenz et al. | |
| 6,484,780 | B2 | 11/2002 | Ashley et al. | |
| 7,206,009 | B2 | 4/2007 | Taniguchi | |
| 2002/0134516 | A1 | 9/2002 | Ashley et al. | |
| 2011/0265931 | A1* | 11/2011 | Sato et al. | ....................... 156/64 |

FOREIGN PATENT DOCUMENTS

EP  0835739  4/1998

OTHER PUBLICATIONS

European Search Report for European Application No. 0835739 dated Nov. 6, 1998.
Hideo Taniguchi, et al., "Development of New Multi-Purpose Heating Head", Society for Imaging Science and Technology; NIP26 and Digital Fabrication 2010 Technical Program and Proceedings, pp. 693-696.

* cited by examiner

*Primary Examiner* — George Koch
(74) *Attorney, Agent, or Firm* — Kile Park Reed & Houtteman PLLC

(57) ABSTRACT

Provided is a direct heating type card lamination apparatus, and more particularly, to a direct heating type card lamination apparatus with a concise and simple structure that performs low power lamination by applying heat directly on a card and performs lamination conveniently and quickly without a waiting time. The direct heating type card lamination apparatus does not perform lamination by a heated roller after heating the roller with a heating element according to a conventional method but performs lamination by directly applying heat on a card by a momentarily heated lamination head. Accordingly, the direct heating type card lamination apparatus quickly and conveniently performs lamination with low power without energy loss or a waiting time.

8 Claims, 4 Drawing Sheets

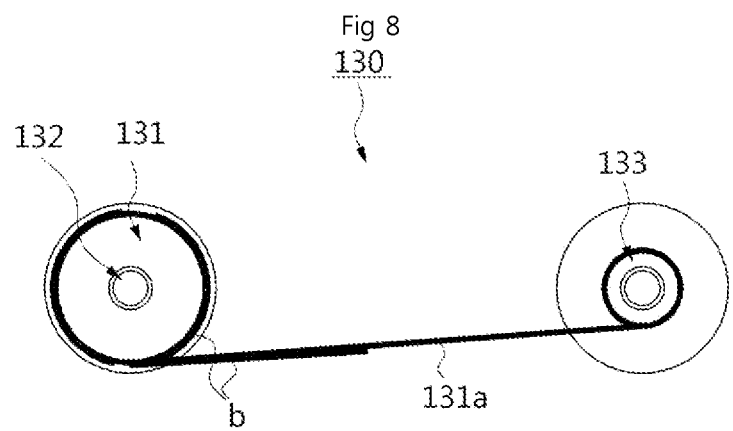
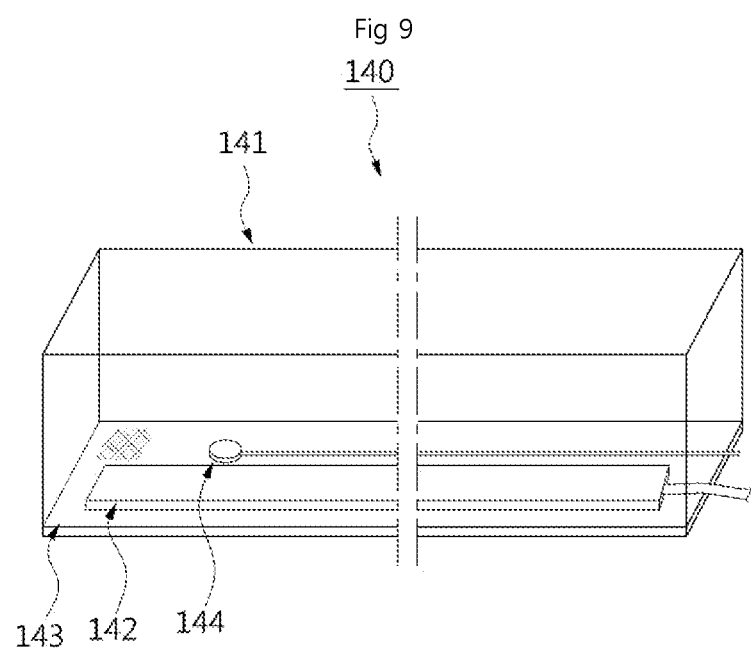

DIRECT HEATING TYPE CARD LAMINATION APPARATUS

TECHNICAL FIELD

The present invention relates to a direct heating type card lamination apparatus, and more particularly, to a direct heating type card lamination apparatus with a concise and simple structure that performs low power lamination by applying heat directly on a card and performs lamination conveniently and quickly without a waiting time.

BACKGROUND ART

Generally, diverse types of plastic cards such as a credit card, a cash card, a transportation card, a membership card, a medical card, an identification card are used in today's society. A lamination patch (called "coating film") of a transparent material is attached on the plastic card to protect a printed surface such as an image, a design, a letter, etc., printed on the surface of the plastic card.

The lamination patch employs an attachment method by heat in a state that the lamination patch is disposed on the card. Diverse types of devices for card lamination are disclosed as described below.

FIG. 1 to FIG. 4 schematically show main constituent elements of a conventional card lamination apparatus.

As shown in FIG. 1, a card lamination apparatus 10, which is called a heat plate heating method, includes a lamination unit 13 disposed between inserting rollers 11 for inserting a card a and dispensing rollers 12 for dispensing a card. A heat plate 13a of the lamination unit 13 is separately disposed between a lower inserting roller 11a and an upper dispensing roller 12a to apply heat to a lamination patch b. A heater 13b for applying heat to the card is installed between a lower inserting roller 11b and a lower dispensing roller 12b.

The card lamination apparatus 10 shown in FIG. 1 is configured to dispose the heater 13b and the heat plate 13a for lamination separately to prevent direct contact with the patch b or the card. Accordingly, in the middle of passing through the heat plate 13a and the heater 13b, the card a and the lamination patch b are attached to each other by heat. The card lamination apparatus 10 has an advantage that it is relatively inexpensive and has a superior durability. However, since the card lamination apparatus 10 does not adopt a method that heat is applied through direct contact with the lamination patch b, there is a high possibility that bubbles are generated to cause production of defective products.

A card lamination apparatus 20 shown in FIG. 2 adopts a heating method that a heater 23 installed on an upper inserting roller 21a for inserting a card transfers heat to an entire upper inserting roller 21a. This heating method is called an indirect roller heating method and is generally adopted for a photograph coating device. The indirect roller heating method is a method that a heat cover 24 besides the heater 23 is individually included to be a medium for transferring heat to the roller. Accordingly, the indirect roller heating method has disadvantages that heat transfer speed is slow and the roller needs to be washed frequently.

A card lamination apparatus 30 shown in FIG. 3 includes lamination units respectively disposed between inserting rollers 31 for inserting a card and dispensing rollers 32 for dispensing a card, and also disposed over inserting rollers 31. That is, a heat plate 33 as the lamination unit is separately disposed between an upper inserting roller 31a and an upper dispensing roller 32a to apply heat to a lamination patch b. A heater 34 for applying heat to a card is installed between a lower inserting roller 31b and a lower dispensing roller 32b. Also, a heater 35 and a heat cover 36 are installed on the upper inserting roller 31a.

The card lamination apparatus 30 adopts a composite heating method that the heat plate heating method of FIG. 1 and the indirect roller heating method of FIG. 2 are combined to compensate for shortcomings of the two methods. Therefore, the card lamination apparatus 30 shows a fast speed and is capable of coating a photograph. However, the card lamination apparatus 30 and has disadvantages that it is expensive and its roller needs to be washed.

Meanwhile, a card lamination apparatus 40 shown in FIG. 4 includes a lamination unit 43 inside an inserting roller 41 for inserting a card. Since a heater as the lamination unit 43 is included inside an upper inserting roller 41a, the card a including the lamination patch b is heated and compressed in the middle of passing through a space between the upper and lower inserting rollers 41a and 41b.

The card lamination apparatus 40 adopts a direct compressing method by the hot roller, which is called a hot roller method or a direct roller heating method. A halogen lamp or a hot-wire type cartridge is applied as a heater for performing lamination.

However, the direct roller heating method shown in FIG. 4 requires a high-capacity heater consuming great power ranging about 200 to 300 w since lamination can be performed after heating the upper inserting roller 41a due to heat generated from a heater 43 installed inside the upper inserting roller 41a. That is, the direct roller heating method has a disadvantage that power consumption is too great. In addition, the upper inserting roller 41a needs to be heated to high temperature of 150r or more in order to perform lamination. Since about 2 to 5 minutes are required for increasing surface temperature of a roller having a large diameter, there is an inconvenience in use due to too long waiting time, i.e., warming up time.

The above-mentioned direct roller heating method has a disadvantage that a great amount of energy is wasted since the heater 43 should unnecessarily maintain a turn-on state to quickly perform lamination and the upper inserting roller 41a heated by the heater emits heat in an entire direction of 360° regardless of lamination besides a lower direction.

The direct roller heating method requires a device for elevation since a roller ascends and descends onto a card to perform lamination. The direct roller heating method also requires a device for a rotary motion since the roller moves as a cloud on a surface of the card. Accordingly, the direct roller heating method has a complicated structure to cause increase of manufacturing cost, frequent troubles and difficulty in maintenance.

DISCLOSURE

Technical Problem

The present invention is invented based on the above description and an embodiment of the present invention is to provide a direct heating type card lamination apparatus that performs lamination with low power by applying heat directly on a card in a moment.

Another embodiment of the present invention is to provide a direct heating type card lamination apparatus that conveniently and quickly perform lamination without a waiting time.

Still another embodiment of the present invention is to provide a direct heating type card lamination apparatus that has a simple and concise structure, reduce a manufacturing cost and a maintenance cost by efficiently performing lamination, thereby reducing a resting time.

Technical Solution

To achieve the embodiment of the present invention, provided is a direct heating type card lamination apparatus, including: a card transferring unit for transferring a card; a patch supplying unit for supplying a lamination patch to be coated on a surface of the card; a lamination head disposed on a transfer route of a card to be monetarily heated by an applied power; and a head elevating unit for performing pressurization to coat a lamination patch on the card by descending the lamination head, and when completely coated, by ascending the lamination head to an original position.

The lamination head may include: a head case; a heating element installed inside a lower portion of the head case to be momentarily heated by an applied power; a heat emitting member installed in a lower portion thereof to heat applied from the heating element; and a temperature sensing unit installed in the head case to sense a heating temperature of the heating element.

The head elevating unit may include: a head fixing member installed inside a frame to mount the lamination head; a head ascending member movably installed in the head fixing member to move the lamination head connected to an end thereof by an applied external force; a head pressurizing member for applying a driving force to the head ascending member such that the lamination head moves toward the card to perform lamination; and a head returning member for applying a return force to the head ascending member to return the lamination head to an original position after performing lamination.

The patch supplying unit may include: a patch roll wound in a roll shape by attaching a plurality of lamination patches on a film of a band form; a patch supply roll, in which the patch roll is installed; and a patch winding roll withdrawn from the patch roll wherein a film portion where lamination is performed is wound via the lamination head.

The card transferring unit may include a plurality of upper and lower transfer rollers along a card transfer route, which are installed to face each other up and down such that a frictional force for transferring the card acts, and a support roller for supporting a card when the lamination head descends in a lower side of the card transfer route corresponding to an installation position of the lamination head.

The card lamination apparatus may include: an input unit for inputting a control signal; a communication module for receiving an input signal transferred from an external device; and a control unit for controlling operations of the card transferring unit, the patch supplying unit, the lamination head and the head elevating unit according to an input signal from the input unit and the communication module.

Advantageous Effects

A direct heating type card lamination apparatus according to the present invention does not perform lamination by a heated roller after heating the roller with a heating element according to a conventional method but performs lamination by directly applying heat on a card by a momentarily heated lamination head. Accordingly, the direct heating type card lamination apparatus quickly and conveniently performs lamination with low power without energy loss or a waiting time.

Since the direct heating type card lamination apparatus according to the present invention has a simple and concise structure that lamination is performed only by elevation movement of a lamination head, a manufacturing cost is reduced and it is easy to be maintained due to a few troubles to reduce a cost for maintenance.

DESCRIPTION OF DRAWINGS

The above and other objects, features and advantages of the present invention will become apparent from the following description of preferred embodiments given in conjunction with the accompanying drawings, in which:

FIG. 8 is a view showing a patch supplying unit, which is applied to the direct heating type card lamination apparatus according to an exemplary embodiment.

FIG. 9 is a view showing a lamination head, which is applied to the direct heating type card lamination apparatus according to an exemplary embodiment.

DETAILED DESCRIPTION OF MAIN ELEMENTS

| 100: direct heating type card lamination apparatus | |
|---|---|
| 110: frame | 120: card transferring unit |
| 130: patch supplying unit | 140: lamination head |
| 150: head elevating unit | 160: input unit |
| 170: communication module | |
| 180: control unit | |
| 180: power unit | 190: power unit |
| 210: display unit | a: card |
| b: lamination patch | |

Best Mode

Hereinafter, the embodiments of the present invention will be described in detail with reference to accompanying drawings.

Figure 1:
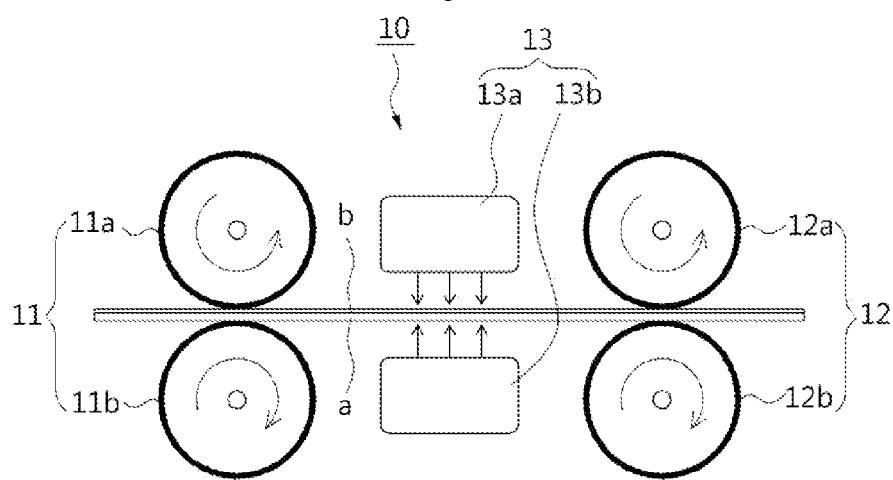
FIG. 1 to FIG. 4 are schematic views showing a conventional card lamination apparatus.
Figure 2:
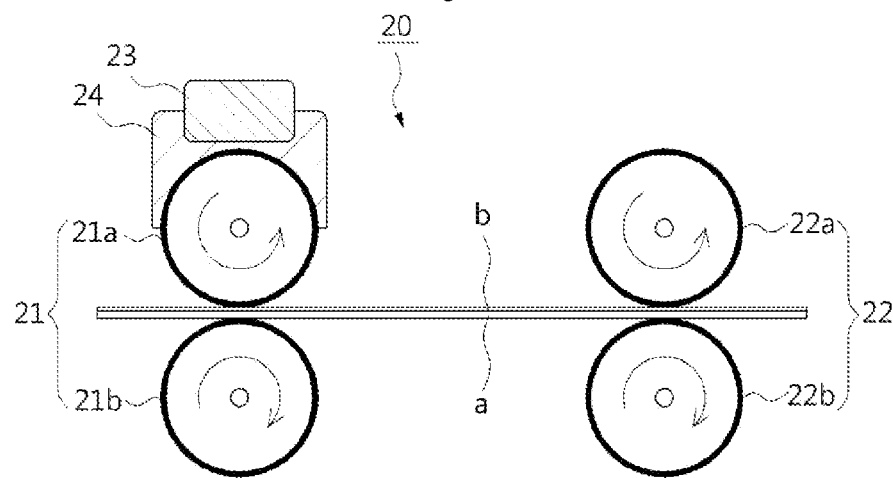
Figure 3:
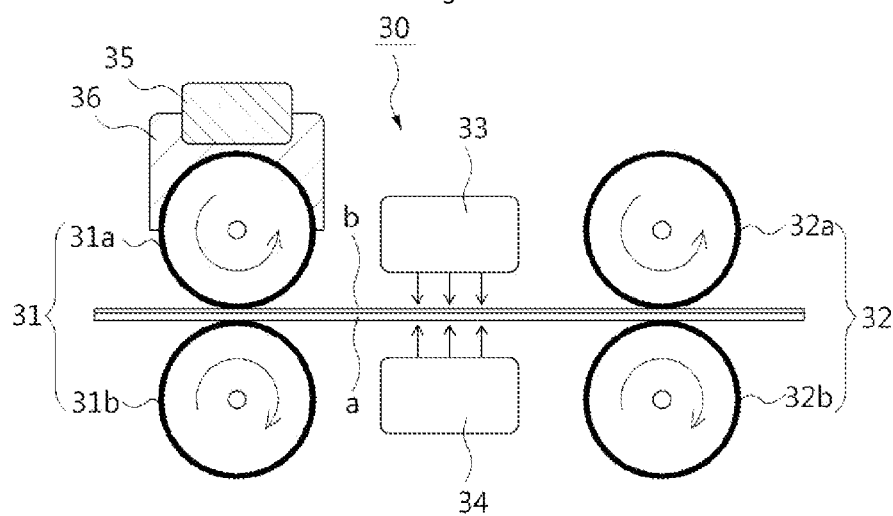
Figure 4:
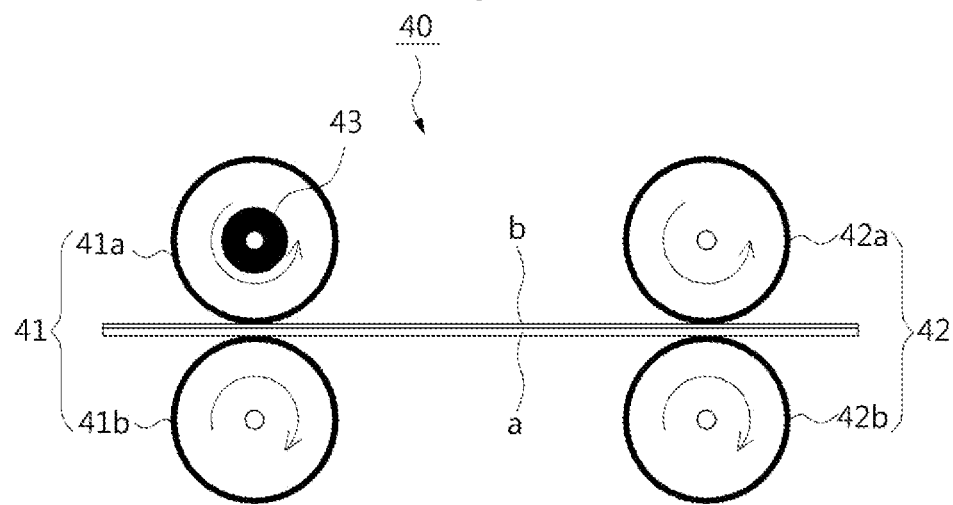
Figure 5:
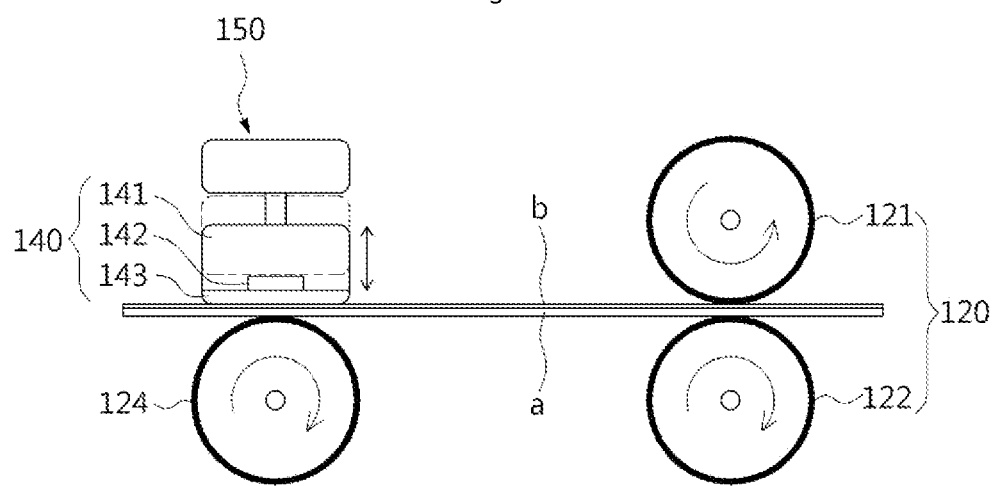
FIG. 5 is a view describing a technical concept of a direct heating type card lamination apparatus according to the present invention.
Figure 6:
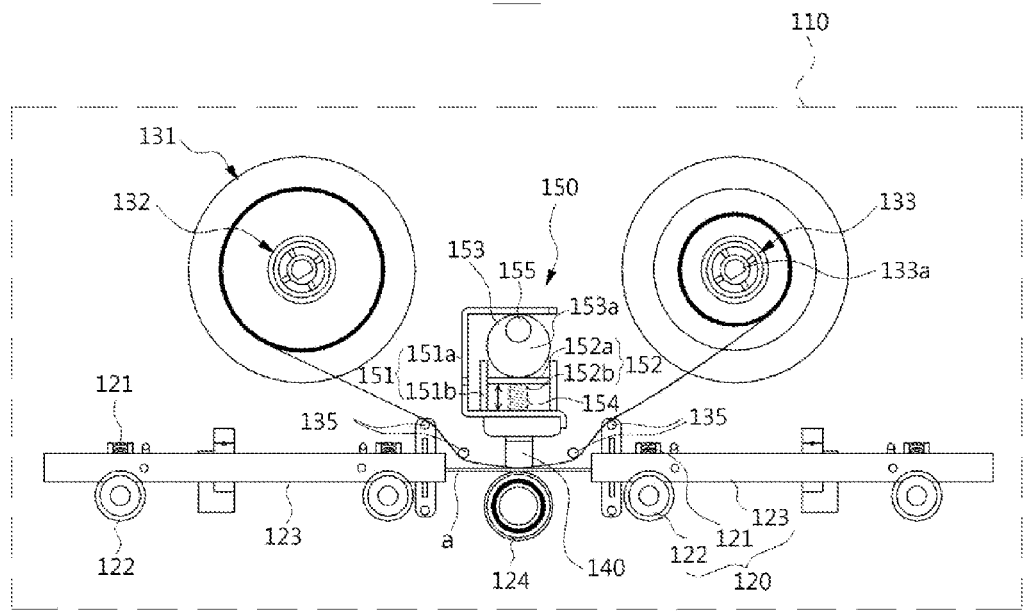
FIG. 6 is a schematic view showing the direct heating type card lamination apparatus according to an exemplary embodiment.
Figure 7:
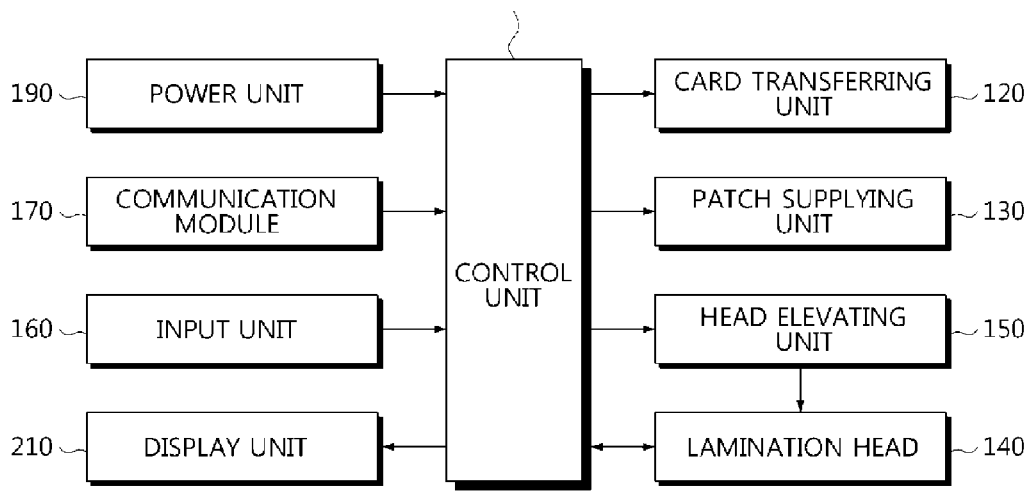
FIG. 7 is a block diagram showing the direct heating type card lamination apparatus according to an exemplary embodiment.

FIG. 5 is a view describing a technical concept of a direct heating type card lamination apparatus according to the present invention. FIG. 6 is a schematic view showing the direct heating type card lamination apparatus according to an exemplary embodiment. FIG. 7 is a block diagram showing the direct heating type card lamination apparatus according to an exemplary embodiment.

With reference to FIG. 5 and FIG. 6, a the direct heating type card lamination apparatus 100 according to the present invention coats a lamination patch b by momentarily applying heat directly on a transferred card a and includes a frame 110, a card transferring unit 120, a patch supplying unit 130, a lamination head 140, and a head elevating unit 150.

The direct heating type card lamination apparatus 100 with the structure as described above is configured such that lamination is performed by transferring the card a by the card transferring unit 120 under the control of a control unit 180 below, supplying the lamination patch b on a coating surface of the card by the patch supplying unit 130 at the same time, and elevating the lamination head 140 by the head elevating unit 150.

As shown in FIG. 7, the direct heating type card lamination apparatus according to an exemplary embodiment further includes an input unit 160, a communication module 170, the control unit 180, a power unit 190, and a display unit 210.

The input unit 160 inputs diverse control signals such as an on/off control button of power and the communication module 170 is a device for receiving an input signal transferred from diverse external devices such as a computer, and a wired or wireless communication terminal. The control unit 180 is an element for controlling driving of the card transferring unit 120, the patch supplying unit 130, the lamination head 140 and the head elevating unit 150 according to input signals from the input unit 160 and the communication module 170. The control unit 180 includes a Mycom storing a program for controlling each of the above-mentioned elements.

The power unit 190 is an element for receiving commercial power from outside and applying the power to each element. The display unit 210 is a display window installed on an external case (not shown), which is overlaid on an outside of the frame 110 to display an input signal and an operation state of the card lamination apparatus.

The card transferring unit 120 is installed inside the frame 110 to transfer the card a along a predetermined route. As shown in FIG. 5, upper and lower transfer rollers 121 and 122 are installed to face each other up and down such that a frictional force for transferring the card a works.

For example, as shown in FIG. 6, the card transferring unit 120 efficiently performs the transferring action by disposing a plurality of up-and-down transfer rollers 121 and 122 along a transfer route of the card, and including a transfer guiding member 123 on the frame 110 corresponding to disposition regions for guiding the transfer of the card a and supporting the upper and lower transfer rollers 121 and 122.

The card transferring unit 120 includes a support roller 124_in a lower side of the transfer route of the card a corresponding to an installation location of the lamination head 140. The support roller 124 makes a holding force to work between the card a and the lamination patch b by supporting the card when the lamination head 140 descends.

Meanwhile, the card transferring unit 120 includes a driving unit (not specifically shown) for the card transferring unit for rolling the upper and lower transfer rollers 121 and 122. The driving unit for the card transferring unit may apply diverse driving methods that are applied to rotate a roller in a card printing filed. For example, the driving unit (not shown) for the card transferring unit may be comprised of a driving motor (not shown) including a driven gear (not shown) installed on a central axis of the upper and lower transfer rollers 121 or 122, an electronic gear (not shown) engaged with the driven gear, and a driving gear (not shown) engaged with the electronic gear. The driving unit for the card transferring unit may be configured by applying a power transferring method configured to transfer power of the driving motor to the upper and lower transfer rollers 121 and 122 by a belt besides the above-mentioned power transferring method using the gear.

FIG. 8 is a view showing a patch supplying unit, which is applied to the direct heating type card lamination apparatus according to an exemplary embodiment. FIG. 8 is a conceptual view showing the main elements schematically.

The patch supplying unit 130 supplies the lamination patch b coated on a surface of the card. If the lamination patch is supplied precisely to a location for lamination, the patch supplying unit 130 of diverse structures or shapes may be configured without limitation. However, in this exemplary embodiment, the patch supplying unit 130 is configured to include a patch roll 131, a patch supply roll 132, and a patch winding roll 133 for the convenience of installation and exchange work. In the patch roll 131, a plurality of lamination patches b are attached on a film 131a of a band form at regular intervals and wound in a roll shape. The patch roll 131 is installed on the patch supply roll 132. In the patch winding roll 133, the waste film 131a, in which lamination is performed, is wound via the lamination head 140 after being withdrawn from the patch roll 131.

The patch supplying unit 130 includes a driving unit for the patch supplying unit (not specifically shown) that moves a film in the process of performing lamination. The driving unit for the patch supplying unit (not shown) may have diverse structures under the condition that it adopts a method of pulling and unwinding the film, which is wound in the patch supply roll 132, by rotating the patch winding roll 133. For example, the driving unit for the patch supplying unit may be comprised of a driving motor (not shown) including a driven gear (not shown) installed on a central axis 133a of the patch winding roll 133, an electronic gear (not shown) engaged with the driven gear, and a driving gear (not shown) engaged with the electronic gear. The driving unit for the patch supplying unit may receive and use torque, which is generated in the driving motor of the above-mentioned card transferring unit 120, by using a power transferring member such as a gear as a medium without an individually equipped driving motor (not shown).

FIG. 9 is a view showing a lamination head, which is applied to the direct heating type card lamination apparatus according to an exemplary embodiment. FIG. 9 shows a structure briefly for better understanding.

The lamination head 140 is disposed on a transfer route of the card a and heated momentarily by the applied power to emit heat. As shown in FIG. 9, the lamination head 140 is configured to include a heating element 142, a heat emitting member 143, and a temperature sensing unit 144 inside a head case 141, which is formed in a hexahedral shape of a square pillar form.

The heating element 142 is installed inside a lower portion of the head case 141 and generates heat while being heated by the applied power. Any heating means that emit heat while being momentarily and quickly heated by applying power may be adopted as the heating element 142 without limitation. In this exemplary embodiment, as shown in FIG. 9, a planar heating element of a thin plate is adopted. Materials of the planar heating element may include metal include copper, carbon and conductive polymer as materials that generate heat by electric resistance when power is applied.

The heat emitting member 143 may be formed in or coupled to a lower portion of the heating element 142 to emit the heat generated and applied from the heating element 142. The heat emitting member 143 may be formed by coating a material having a superior heating property or be installed by adding a member of a thin plate made of a material having a superior heating property. For example, the heat emitting member 143 may be configured by coating a coating material having a superior heat transfer efficiency and a low frictional coefficient or adding a thin plate made of ceramic.

The temperature sensing unit 144 is installed inside the head case 141 to sense a heating temperature of the heating element 142. A temperature sensor including a negative temperature coefficient (NTC) thermistor element and a positive temperature coefficient (PTC) thermistor element may be installed. The NTC thermistor element has a property of a negative resistance temperature coefficient that when a temperature increases, a resistance value decreases. The PTC thermistor element has a property of a constant resistance temperature coefficient that when the temperature increases, the resistance value increases.

Meanwhile, the head elevating unit 150 applies pressure by descending the lamination head 140 to coat the lamination patch b on the card a. When the coating is completed, the head elevating unit 150 ascends the lamination head 140 again. Diverse mechanisms for efficiently ascending and descending the lamination head 140 under the control of the control unit 180 may be applied. As shown in FIG. 6, in this exemplary embodiment, the head elevating unit 150 includes a head fixing member 151, a head ascending member 152, a head pressurizing member 153, and a head returning member 154.

The head fixing member 151 is installed inside the frame 110 such that the lamination head 140 is installed. The head fixing member 151 includes a fixer 151*a* installed on the frame 110 and a supporter 151*b* for guiding and supporting elevation movement of the head ascending member 152 below. As shown in FIG. 6, the supporter 151*b* includes a pair of longitudinal members, which are formed to stand upright.

The head ascending member 152 is movable installed on the head fixing member 151 and contacts with the lamination head 140 at one end. When an external force is applied from the head pressurizing member 153, lamination is performed by moving the lamination head 140 toward a card. When elastic force acts from the head returning member 154, the head ascending member 152 returns the lamination head 140 to an original position.

The head ascending member 152 includes a transverse member 152*a* and a connecting rod 152*b*. The transverse member 152*a* is installed between supporters 151*b* of the head fixing member 151 to be capable of elevating in a transverse direction. The connecting rod 152*b* is connected to a lower portion of the transverse member 152*a* to contact with the lamination head 140 at a lower end.

The head pressurizing member 153 moves the lamination head 140 toward the card a to perform lamination. The head pressurizing member 153 is installed in the frame 110 and includes an eccentric cam that moves the lamination head 140 toward the card a by pressurizing the transverse member 152*a* by an eccentric portion 153*a* when rotating. A cam shaft 155 is installed on a center of the eccentric cam. A gear (not shown) or a pulley (not shown) receiving torque is installed on an end portion of the cam shaft 155 and rotate the eccentric cam while rotating to be engaged with operations of the card transferring unit 120 and the patch supplying unit 130.

The head returning member 154 returns the lamination head 140 to the original position after performing lamination. The head returning member 154 includes an elastic member installed to be inserted into a circumferential surface of the connecting rod 152*b*. When the eccentric portion 153*a* of the head pressurizing member 153 deviates from the transverse member 152*a*, the elastic member ascends and returns the lamination head 140 to the original position by applying an elastic force to the transverse member 152*a*.

Meanwhile, a reference numeral 135 of FIG. 6 is a guide roller installed to transfer a film, which is withdrawn from the patch supply roll 132 and transferred to the patch winding roll 133, along a route where lamination is efficiently performed.

Hereinafter, operations of the direct heating type card lamination apparatus according to an exemplary embodiment will be described briefly.

As shown in FIG. 6, when the card is held between the upper and lower transfer rollers 121 and 122 of the card transferring unit 120 and is transferred from left to right by a frictional force, and the patch winding roll 133 rotates in a counterclockwise direction by operations of the driving unit for the patch supplying unit (not shown) of the patch supplying unit 130, a film wound in the patch supply roll 132 is pulled, unwound and withdrawn, and moves via a lower side of the lamination head 140.

At a time that a front end of the lamination patch b and a front end of the card a enter lower side of the lamination head 140 while the card a and the film 131*a* moves by the operation described above, the head elevating unit 150 operates under the control of the control unit 180 and then the lamination head 140 descends. At this time, since the lamination head 140 applies a compressive force to the lamination patch b and the card a and at the same time, heat emitted from the heating element 142 is directly transferred via the heat emitting member 143, the surface of the card a and the lamination patch b are joined to each other momentarily. In such a state, the card and the film are transferred and lamination is performed while the heat emitting member 143 of the lamination head 140 slides on a surface of the lamination film 131*a*.

The operation process of the head elevating unit 150 will be described more specifically. When the eccentric portion 153*a* of the head pressurizing member 153, i.e., the eccentric cam, which rotates by the cam shaft 155, is located in a lower side, the transverse member 152*a* of the head ascending member 152 is pressurized to make the connecting rod 152*b* move downwardly. At this point, while the lamination head 140 connected to the lower end of the connecting rod 152*b* descends on the film and the card, a connecting work is performed.

After the lamination is performed for a predetermined time, the eccentric portion 153*a* ascends according to rotation of the head pressurizing member 153 under the control of the control unit 180. Subsequently, the head ascending member 152 ascends by an elastic force of the head returning member 154 and the connected the lamination head 140 returns to the initial state.

According to the method described above, while the card transferring unit 120 continuously transfers the card a under the control of the control unit 180 and transfers the film attached with many lamination patches through the patch supplying unit 130, the lamination head 140 is repetitively ascended by operating the head elevating unit 150, thereby continuously and conveniently performing lamination of the card.

The direct heating type card lamination apparatus 100 according to the present invention does not adopt a conventional method of performing pressurization after heating a roller using a heating element as a method for applying heat to the lamination patch b but adopts a method of applying heat directly on the lamination patch b and the card a while the heated lamination head 140 descends. Accordingly, the direct heating type card lamination apparatus 100 has an advantage that lamination is efficiently performed although a heating element consuming power of about 80 w is applied. That is, the direct heating type card lamination apparatus 100 reduces power consumption, prevents waste of energy and decreases a cost for lamination. In addition, since it is not required to heat a roller, an additional waiting time is not required. Since it is possible to quickly perform lamination, efficiency and convenience are remarkably improved in performing the lamination.

Since the direct heating type card lamination apparatus 100 according to the present invention has a concise and simple structure that lamination can be performed only by the elevating operation of the lamination head 140, the direct heating type card lamination apparatus 100 reduces a manufacturing cost and is easily maintained due to a little trouble factors, thereby reducing a cost for maintenance.

The above description is suggested only as an exemplary embodiment for realizing the direct heating type card lamination apparatus according to the present invention described above. The present invention is not limited to the exemplary embodiment. It will be apparent that various changes and modifications may be made by those skilled in the art without deviating from the basic concept and scope of the invention as set forth in the appended claims.

The invention claimed is:

1. A direct heating type card lamination apparatus, comprising:
   a card transferring unit for transferring a card;
   a patch supplying unit for supplying a lamination patch to be coated on a surface of the card;
   a lamination head disposed on a transfer route of a card to be monetarily heated by an applied power wherein the lamination head comprises:
      a head case;
      a planar heating element installed inside a lower portion of the head case to be momentarily heated by an applied power;
      a heat emitting member or a plate installed in a lower portion thereof to emit heat applied from the heating element to the lamination patch by direct contact; and
      a temperature sensing unit installed in the head case to sense a heating temperature of the heating element; and
   a head elevating unit for performing pressurization to coat a lamination patch on the card by descending the lamination head, and when completely coated, by ascending the lamination head to an original position wherein the head elevating unit comprises:
      a head fixing member installed inside a frame to mount the lamination head;
      a head ascending member movably installed in the head fixing member to move the lamination head connected to an end thereof by an applied external force;
      a head pressurizing member for applying a driving force to the head ascending member such that the lamination head moves toward the card to perform lamination; and
      a head returning member for applying a return force to the head ascending member to return the lamination head to an original position after performing lamination,
      wherein said head fixing member comprises a fixer installed inside the frame and a pair of supports fixed to the fixer to stand upright for guiding and supporting elevation movement of the head ascending member and
      wherein said head ascending member comprises a transverse member installed between the pair of supports of the head fixing member to be capable of elevating in a transverse direction.

2. The card lamination apparatus of claim 1, wherein the patch supplying unit comprises:
   a patch roll wound in a roll shape by attaching a plurality of lamination patches on a film of a band form;
   a patch supply roll, in which the patch roll is installed; and
   a patch winding roll withdrawn from the patch roll wherein a film portion where lamination is performed is wound via the lamination head.

3. The card lamination apparatus of claim 2, wherein the card lamination apparatus comprises:
   an input unit for inputting a control signal;
   a communication module for receiving an input signal transferred from an external device; and
   a control unit for controlling operations of the card transferring unit, the patch supplying unit, the lamination head and the head elevating unit according to an input signal from the input unit and the communication module.

4. The card lamination apparatus of claim 1 wherein the card transferring unit comprises a plurality of upper and lower transfer rollers along a card transfer route, which are installed to face each other up and down such that a frictional force for transferring the card acts, and
   a support roller for supporting a card when the lamination head descends in a lower side of the card transfer route corresponding to an installation position of the lamination head.

5. The card lamination apparatus of claim 4, wherein the card lamination apparatus comprises:
   an input unit for inputting a control signal;
   a communication module for receiving an input signal transferred from an external device; and
   a control unit for controlling operations of the card transferring unit, the patch supplying unit, the lamination head and the head elevating unit according to an input signal from the input unit and the communication module.

6. The card lamination apparatus of claim 1, wherein the card lamination apparatus comprises:
   an input unit for inputting a control signal;
   a communication module for receiving an input signal transferred from an external device; and
   a control unit for controlling operations of the card transferring unit, the patch supplying unit, the lamination head and the head elevating unit according to an input signal from the input unit and the communication module.

7. The card lamination apparatus of claim 1, wherein the card lamination apparatus comprises:
   an input unit for inputting a control signal;
   a communication module for receiving an input signal transferred from an external device; and
   a control unit for controlling operations of the card transferring unit, the patch supplying unit, the lamination head and the head elevating unit according to an input signal from the input unit and the communication module.

8. The card lamination apparatus of claim 1, wherein the card lamination apparatus comprises:
   an input unit for inputting a control signal;
   a communication module for receiving an input signal transferred from an external device; and
   a control unit for controlling operations of the card transferring unit, the patch supplying unit, the lamination head and the head elevating unit according to an input signal from the input unit and the communication module.

* * * * *